R. LAST.
MACHINE FOR MAKING CONCRETE PIPES OR THE LIKE.
APPLICATION FILED JAN. 30, 1920.

1,382,202.

Patented June 21, 1921.

Witnesses
Edwin Levisohn

RIJKENT LAST
Inventor
By
Attorney

UNITED STATES PATENT OFFICE.

RIJKENT LAST, OF ENKHUIZEN, NETHERLANDS.

MACHINE FOR MAKING CONCRETE PIPES OR THE LIKE.

1,382,202.  Specification of Letters Patent.  Patented June 21, 1921.

Application filed January 30, 1920. Serial No. 355,218.

*To all whom it may concern:*

Be it known that I, RIJKENT LAST, manufacturer, a subject of the Queen of the Netherlands, residing at Enkhuizen, in the Province of North Holland, have invented certain new and useful Improvements in Machines for Making Concrete Pipes or the like, of which the following is a specification.

Machines for making concrete pipes are known in which the mold is mounted on a table which is rotated at a definite speed from the main shaft which drives the rammer while the rammer itself is moved up and down by means of a crank and is guided between two suitably arranged blocks or guides. In such machines the crank is driven by belt gearing and the belt pulleys are attached to two lattice girders pivotally connected to each other. One of said girders when in its central position is vertical but can turn on the main shaft as a center while the other girder which carries the crank shaft is guided vertically at its free end and is balanced by a counterweight for the purpose of regulating the height of the crank. It is clear that with this arrangement only pipes of circular section can be made because the rammer has only a vertical movement which is always in the same plane.

The present invention relates to machines of the above described type and has for its object to provide means whereby noncircular pipes or the like of any desired section can be produced.

According to this invention the said object is achieved by making the block or the like in which the rammer is guided, movable to and fro in a horizontal direction and driving it by means of a member which is moved synchronously with the rammer mold.

Figure 1:
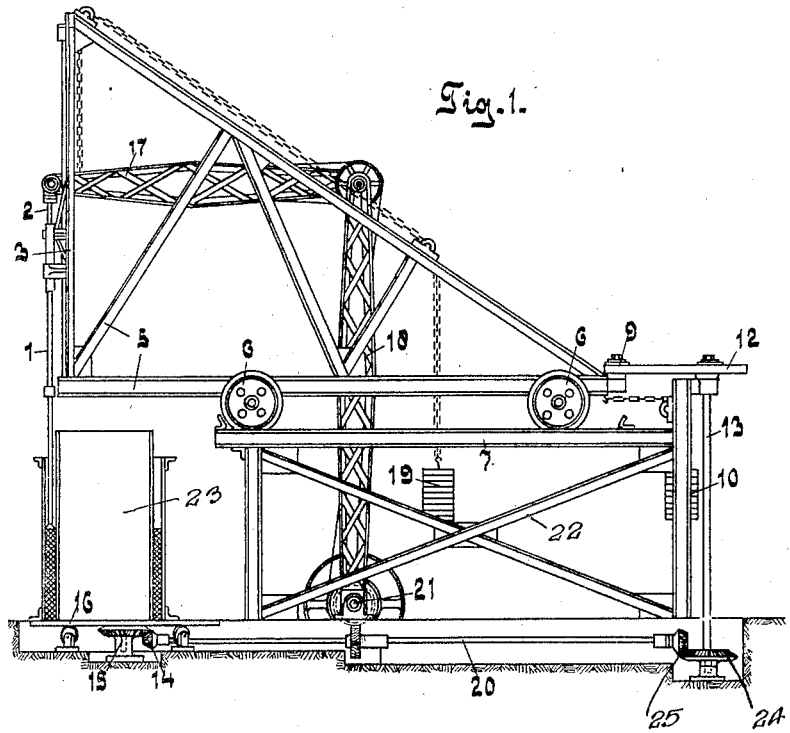
Figure 2:
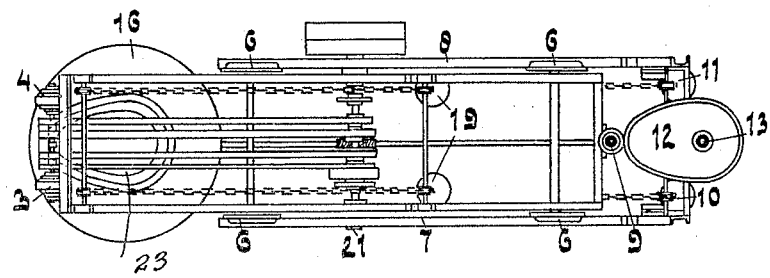

In the accompanying drawing which illustrates one constructional form of the invention Figure 1 is a side elevation and Fig. 2 a plan.

The rammer 1, which is moved up and down by means of a crank 2, is guided vertically between blocks 3 and 4, or the like, carried by a frame 5, which is preferably constructed as shown, of angle iron and which, by the aid of wheels 6, can be moved horizontally upon rails 7 and 8 mounted on a frame 22. On the end of the frame 5 remote from the rammer 1 is mounted a roller 9 which is held in constant contact with the periphery of a cam, or the like, 12 by counterweights 10 and 11, or by means of springs, the said cam being of the same shape as the mold 23 in which the pipe is to be rammed but smaller by half the thickness of the wall of the pipe. The cam 12 is mounted on a vertical shaft 13 which is driven by means of bevel wheels 24, 25, a shaft 20 which in its turn is driven from the main shaft 21 by means of a worm and worm wheel. The said shaft also carries a bevel wheel 14 which meshes with a second gear wheel 15 keyed on the shaft of a horizontal revolving table 16 which carries the mold 23.

The ratio of transmission of the gearing is such that the shaft 13 and the table 16 carrying the mold 23 rotate at the same speed and in the same direction.

As in the known arrangements the crank 2 is driven from the main shaft 21 by means of belt gearing, the belt pulleys being carried by lattice girders 17 and 18 pivotally connected to each other. The girder 18 is vertical in its central position and can turn about the main shaft 21 as a center. The girder 17 is balanced by means of counterweights 19 and is guided at its free end in the frame 5. The crank 2 may if desired be driven by an electromotor acting directly on the crank shaft and the girders 17, 18 could then be dispensed with which obviously considerably simplifies the machine.

It is clear that the invention is not limited to the constructional form described and illustrated. Thus for example the edge cam 12 bearing against the roller 9 might be replaced by a cam having a groove of the desired contour with which engages a pin or roller arranged on the side of the frame 5 remote from the rammer. The counterweights 10 and 11, which in the above described constructional form, held said frame against the cam 12 would then be unnecessary. The weights 10 and 11 may also be replaced by another force, such as springs, constantly pulling on the frame 5. The said frame may also be moved by means of a drum having a groove of the desired contour engaging a pin or roller, carried by the frame 5, which follows the course of the groove and in this way moves said frame. The movement of the shaft 20 may be transmitted by means of a chain to said drum.

What I claim is:

1. A machine for making concrete pipes comprising a rotatable non-circular mold and a rammer moved up and down by a crank and guided between blocks carried by a frame, said frame being provided with wheels and moved horizontally upon rails by means of a member moving synchronously with said mold.

2. In a machine for making concrete pipes, a rotatable non-circular mold, a reciprocable rammer for compacting the material in the mold, a frame carrying guides for guiding said rammer during its reciprocation, and means corresponding in shape to the shape of the mold for reciprocating said frame in a direction substantially at right angles to the direction of reciprocation of the rammer, whereby the operative position of the rammer in the mold is varied.

3. In a machine for making concrete pipes, a rotatable non-circular mold, a frame reciprocable relatively to said mold, guide members carried at one end of said frame, a rammer reciprocable in said guide members for compacting the material in the mold, and a cam and roller mechanism at the other end of said frame for reciprocating the latter to vary the operative position of the rammer in the mold.

4. A machine for making concrete pipes comprising a rotatable non-circular mold, a rammer reciprocated by means of a crank and guided between blocks carried by a frame mounted upon wheels and movable horizontally, a roller on said frame at the side remote from the rammer and maintained constantly in contact with a cam of the same shape as the mold of the pipe to be rammed but smaller by half the thickness of the wall of said pipe, a shaft carrying said cam and driven by bevel wheels from a second shaft rotated from the main shaft by a worm and worm wheel, and a bevel wheel on said second shaft gearing with a gear wheel on the shaft of a table carrying said mold, the ratio of the gear wheels being such that said cam rotates at the same speed and in the same direction as said mold-table.

In testimony whereof I have affixed my signature.

RIJKENT LAST.